US008387778B2

(12) United States Patent
Kokko et al.

(10) Patent No.: US 8,387,778 B2
(45) Date of Patent: Mar. 5, 2013

(54) APPARATUS FOR STORING ROLLING MATERIAL IN A PILE AND RECLAIMING FROM THE PILE

(75) Inventors: Pekka Kokko, Hollola (FI); Heikki Ohvo, Hollola (FI)

(73) Assignee: Andritz Oy, Helsinki (FI)

( * ) Notice: Subject to any disclaimer, the term of this patent is extended or adjusted under 35 U.S.C. 154(b) by 91 days.

(21) Appl. No.: 12/997,640

(22) PCT Filed: Jun. 10, 2009

(86) PCT No.: PCT/FI2009/050494
§ 371 (c)(1),
(2), (4) Date: Dec. 13, 2010

(87) PCT Pub. No.: WO2009/150300
PCT Pub. Date: Dec. 17, 2009

(65) Prior Publication Data
US 2011/0088998 A1    Apr. 21, 2011

(30) Foreign Application Priority Data

Jun. 11, 2008  (FI) ..................................... 20080403

(51) Int. Cl.
*B65G 65/28* (2006.01)
(52) U.S. Cl. ........................................ 198/508; 198/519
(58) Field of Classification Search .................. 198/519, 198/861.4, 861.6, 508; 414/133
See application file for complete search history.

(56) References Cited

U.S. PATENT DOCUMENTS

| 3,509,985 | A | | 5/1970 | Fischer | |
|---|---|---|---|---|---|
| 4,244,463 | A | * | 1/1981 | Bartley | ........................ 198/508 |
| 4,363,396 | A | * | 12/1982 | Wolf et al. | ..................... 198/508 |
| 4,629,060 | A | * | 12/1986 | Schlegel et al. | ............... 198/508 |
| 5,310,121 | A | * | 5/1994 | Nilson et al. | ..................... 241/27 |
| 7,000,757 | B1 | * | 2/2006 | Schlegel et al. | ............... 198/519 |
| 7,226,011 | B2 | * | 6/2007 | Schlegel et al. | .......... 241/186.35 |

FOREIGN PATENT DOCUMENTS

| DE | 12 86 456 | 1/1969 |
|---|---|---|
| DE | 26 04 829 | 8/1977 |
| DE | 245 213 | 4/1987 |
| DE | 101 12 342 | 9/2002 |
| EP | 0 162 318 | 11/1985 |

OTHER PUBLICATIONS

International Search Report for PCT/FI2009/050494, mailed Oct. 23, 2009.
Written Opinion for PCT/FI2009/050494, mailed Oct. 23, 2009.

* cited by examiner

*Primary Examiner* — James R Bidwell
(74) *Attorney, Agent, or Firm* — Nixon & Vanderhye P.C.

(57) ABSTRACT

The invention relates to an apparatus for stacking rolling material, such as wood chips, bark or grain into a pile (10) and reclaiming from the pile (10) to a conveyor (20) located below the storing point, said apparatus comprising a center column (30) that supports a stacker boom (40) and a reclaimer boom (50) that are hinged to be turnable independently of each other in relation to the vertical axis of the center boom (30). A characteristic feature of the apparatus is that at least at one point that is hinged in relation to the center column (30) the supporting is arranged resting on a support wheel (60, 60', 60") arranged around the frame of the center column (30).

23 Claims, 3 Drawing Sheets

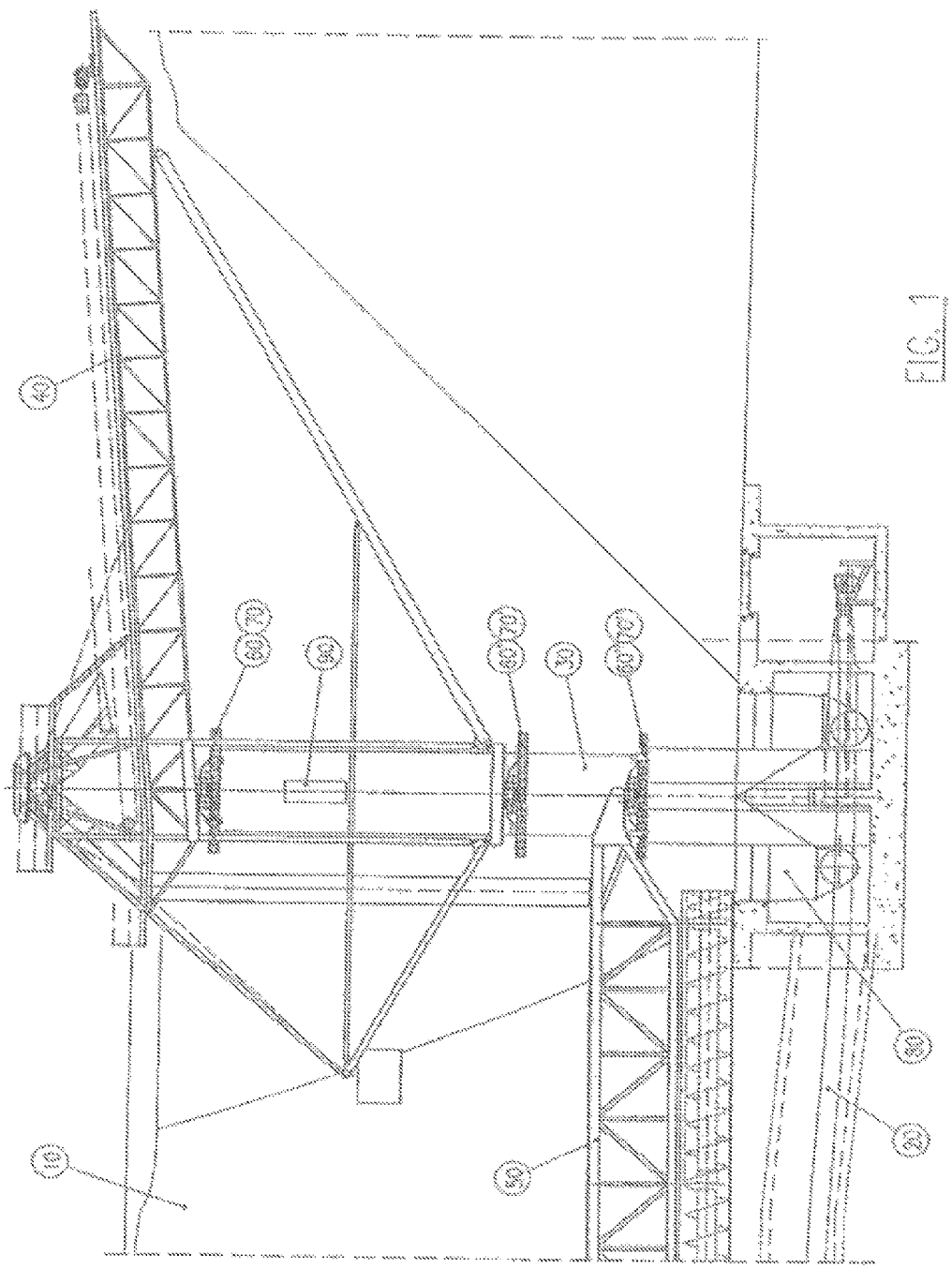

APPARATUS FOR STORING ROLLING MATERIAL IN A PILE AND RECLAIMING FROM THE PILE

BACKGROUND

This application is the U.S. national phase of International Application No. PCT/FI2009/050494 filed 10 Jun. 2009 which designated the U.S. and claims priority to FI Patent Application No. 20080403 filed 11 Jun. 2008, the entire contents of each of which are hereby incorporated by reference.

The present invention relates to an apparatus for storing rolling material in an open storage pile and more specifically to an apparatus for stacking and reclaiming material, i.e. to a stacker/reclaimer. Most preferably the invention relates to storing of wood chips, but it is applicable for storing other granular material such as wood bark, coal, corn or fine-grained material.

Storage piles are needed for homogenizing the material and on the other hand for blending possibilities. The stacker/reclaimer for this kind of storage pile comprises two main parts: the stacking system and the reclaiming system. The stacker/reclaimer comprises e.g. a center column, a stacker conveyor and a reclaimer conveyor. The center column supports concentrically the upper stacker conveyor and the lower reclaimer conveyor. The stacker conveyor adds loose material in the pile, while the reclaimer conveyor conveys the material from the pile towards the slewing center of the stacker/reclaimer. In the slewing center the material to be discharged is transferred to an underground discharge conveyor. Both the stacker and the reclaimer are independently turnable around the center column; first the stacker forms an arched pile around the center column and the reclaimer follows discharging material from the first-built part of the pile. Thus the stacker/reclaimer achieves a real FIFO (FirstInFirstOut)-operation.

In many prior art stacker/reclaimers the stacker boom is supported on a slewing bearing with a diameter up to 2.5 meters and located at the end of the center column. In some known solutions the slewing bearing is close to the ground level. A slewing bearing is expensive and its delivery time from purchase order is long, even up to approximately 2 years. If the slewing bearing gets damaged, its replacement is very labor-consuming and expensive. The stacker boom is supported at one point directly on concrete supports arranged in the center column. Additionally, the concrete construction of the center column extends up to the slewing hinge. Rotating power supply to the booms has traditionally been arranged on the outer surface of the center column due to the concrete construction of the column. This kind of center column construction is heavy and expensive to build.

A further problem of prior art is difficult controlling of the so-called emergency slewing. In prior art technique, when emergency slewing is required, i.e. when the wind is heavy, the brake of the electric motor of the boom-slewing device is opened. However, this kind of solution involves the risk damage of the electric motor or the slewing gear due to uncontrollable slewing speed. If said parts when damaged jam during heavy wind, rapid stopping can harm the slewing bearing, or the stacker pile or the center column can be damaged e.g. by twisting or rotating.

SUMMARY OF INVENTION

A totally novel type of solution for supporting and hinging the slewing booms of a stacker/reclaimer has been developed. The stacker and/or reclaimer booms are supported directly on the center column of the stacker/reclaimer against support wheels turning together with the boom. A wheel of the same kind and also size can be used in all support points of the center column, which facilitates the maintenance and spare part purchasing of the support wheels. Preferably the support wheel is made of steel.

The invention, in at least one embodiment, allows to get rid of the possibly damagable slewing bearing which also is very difficult to replace. The support wheel is split, whereby it is easy to mount outside the center column and if needed to demount therefrom. Also, replacement of one support wheel is possible without needing to dismount major parts of the center column.

When the support of the booms and slewing hinge does not require concrete support, but a support wheel according to the invention is used, the construction of the part of the center column that is above ground level can be made essentially of steel. This results in a significantly lighter and cheaper construction. As the construction of the center column is made of steel, the power supply can be arranged inside the center column, which is a remarkably cheaper solution than in the conventional center columns with concrete construction. A further advantage of a center column with steel construction is that the spiral staircase and emergency exit can be arranged inside the center column.

Further, the stacker boom can be supported to the center column with support wheels at two points that are considerably far away from each other, whereby the construction becomes significantly more rigid. Additionally, a counterweight hanging from a wire can be arranged on the side of the column opposite to the stacker boom, whereby the loading caused by the stacker boom and the support required by the center column can be reduced. The support wheels carry both vertical and horizontal loads.

Additionally, the support wheels have a vertical regulation, by means of which the vertical forces caused by the stacker boom supported at two points can be evenly distributed on the support wheels, on of which the stacker boom is fastended, preferably on the uppermost and the middle support wheels. The support wheels and the booms are fastened with a hinged joint, which allows the position of the boom to change in relation to the support wheel and on the other hand balances the vertical forces focused from the boom to the support wheel between the vertical support wheels.

By means of the support wheel it is also possible to arrange safe emergency slewing for the stacker boom in case of excessively hard wind, as well as secure slewing under normal conditions. At least one support wheel is provided with hydraulic slewing cylinders and brakes with grippers. The grippers of the slewing cylinders causing the slewing motion of the boom adhere to the support flanges of the center column when there is pressure in the cylinders and open by spring load when pressure if off. The grippers of the brakes in their turn are fastened by means of a spring when there is no pressure in the cylinders and open when the pressure is on. This way, the system is safe and secure and locks the boom in one position even if there is a fault in hydraulics or in power supply problem situations. The stacker according to the invention operates in wind speeds up to approximately 75 km/h. At wind speeds above 75 km/h the hydraulic brakes and grippers are fastened and hold the stacker boom in its position until the wind force becomes strong enough to slowly turn the support wheel of the boom as the hydraulic brakes decelerate it actively. That is, the hydraulic brakes with grippers do not allow the boom the turn freely with the wind, possibly with accelerating speed, but actively decelerate the motion. Preferably the decelerating support wheel is the uppermost support wheel of the center column.

SUMMARY OF FIGURES

In the following, the invention is disclosed in more detail with reference to the appended figures, of which FIG. 1 illustrates the center column of the stacker/reclaimer and the support of the stacker and reclaimer booms in side view.

DETAILED DESCRIPTION

Figure 2A:
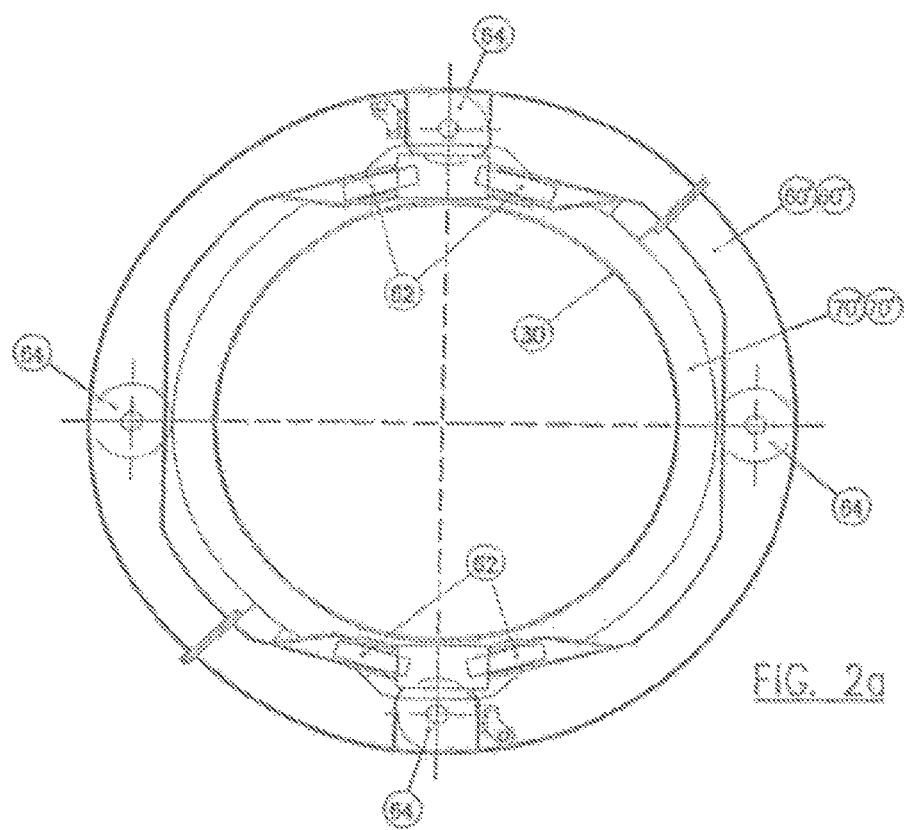
FIG. 2a illustrates a support wheel from above.

FIG. 1 illustrates an apparatus for stacking rolling material, such as wood chips, in a pile 10 and reclaiming from the pile 10 to a discharging conveyor 20 below the storing point. The stacker/reclaimer comprises a center column 30, whereto a stacker boom 40 and a reclaimer boom 50 a supported. Further the apparatus comprises an equalizing hopper 80. In the figure the stacker boom 40 is supported to the center column 30 on support wheels 60, 60' at two points such as hinges 61. According to the invention, also the reclaimer boom 50 is supported to the center column on a corresponding support wheel 60", such as in the figure. The support wheels 60, 60' and 60" can all be similar and of the same size, whereby the maintenance and spare part purchasing becomes easier. The spacing of the fastening of the booms 40, 50 and the support wheels 60, 60', 60" in the vertical direction is separately adjustable by means of at least one baffle plate. In this way the vertical loads of the stacker boom 40 can be evenly distributed to two support wheels 60 and 60'.

In the solution according to the invention an emergency exit 90 from the center column 30 is located between the support wheels 60, 60' of the stacker boom 40.

Figure 2B:
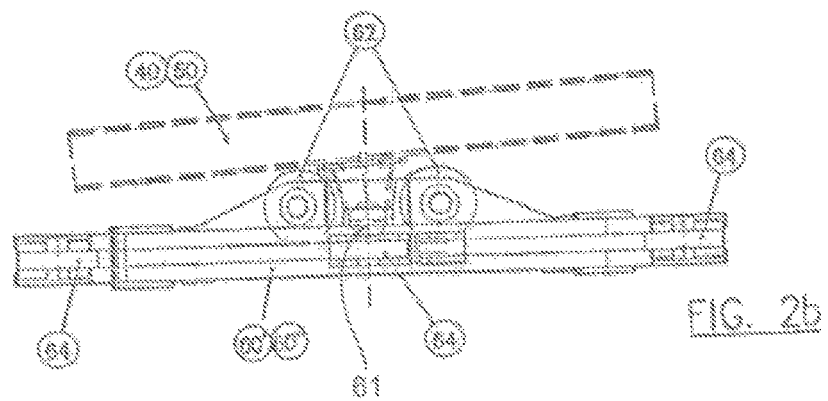
FIG. 2b illustrates a support wheel in side view.

FIGS. 2a and 2b illustrate from above and in side view the support wheel 60', 60" according to a preferred embodiment of the invention, which are used in the support of the stacker and/or reclaimer boom. The support wheel of the figure is provided with four vertical support wheels 62 and four horizontal support wheels 64. The number of the wheels may vary if needed. The vertical support wheels roll on a support flange 70', 70" and the horizontal support wheels on the outer circumference of the support flange. The support flange 70', 70" is fastened to the steel constructed center column 30 preferably by welding, and troublesome groutings are not needed. This kind of construction of the supporting of the booms also saves space around the center column compared to prior art, where lateral support wheels are required on both sides of a grouted bar, on which a large support wheel travels.

Figure 3A:
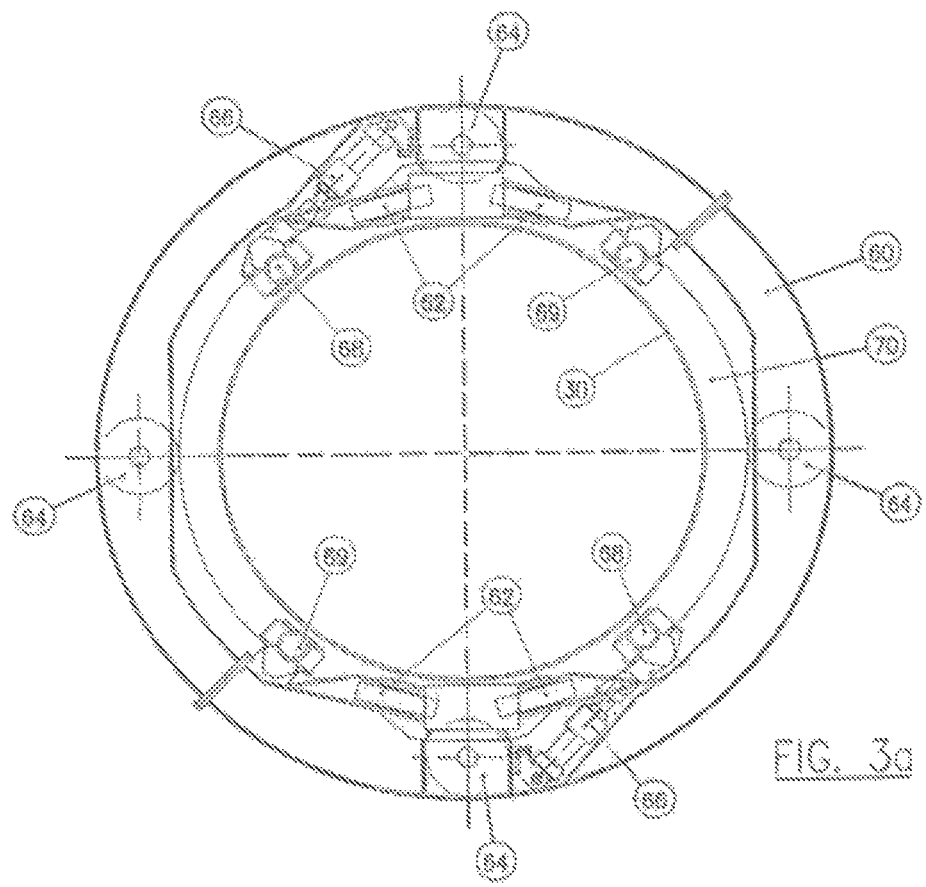
FIG. 3a illustrates a support wheel from above.
Figure 3B:
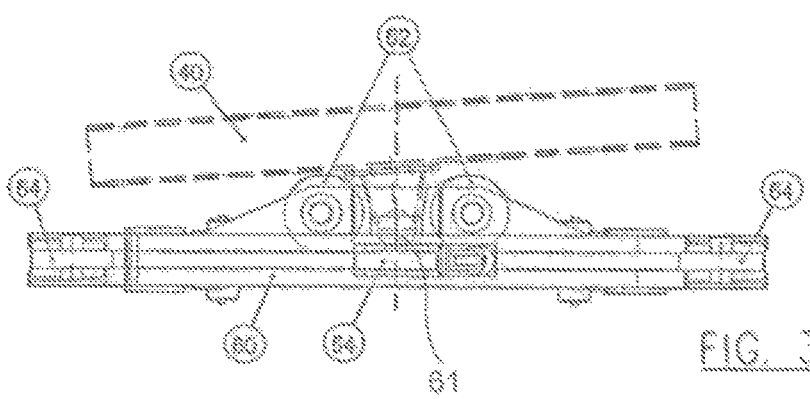
FIG. 3b illustrates a support wheel in side view.

FIGS. 3a and 3b illustrate from above and in side view a support wheel 60 according to another preferred embodiment of the invention, which are used in the support of the stacker and/or reclaimer boom. The support wheel is provided with slewing cylinders 66, which preferably is a hydraulic cylinder, and with slewing grippers 68 fastened to the end of the piston rod of the cylinders, by means of which the supported stacker boom 40 can be turned in relation to the center column by pulling or pushing the support flange and if needed to control emergency slewing. Braking grippers 69 are stationary fastened to the support wheel. Contrary to the slewing grippers, the braking grippers are closed by spring load to the support frame when hydraulic pressure is off and open when the pressure is on to the grippers. FIG. 3b illustrate the same support wheel in side view.

Although the above description relates to an embodiment of the invention that is in the light of present knowledge considered the most preferable, it is obvious to a person skilled in the art that the invention can be modified in many different ways within the broadest possible scope defined by the appended claims alone.

The invention claimed is:

1. An apparatus for stacking material in a pile and recovering the material from the pile, the apparatus comprises:
    a center column having a vertical axis;
    a stacker boom supported by the center column and turning about the vertical axis of the center column;
    a reclaimer boom supported on the center column and turning about the vertical axis of the center column independently of the stacker boom, and
    a support wheel ring assembly around the center column providing a pivotable coupling between the center column and at least one of the stacker boom and the reclaimer boom, wherein the pivotable coupling enables the at least one of the stacker boom and reclaimer boom to pivot about a horizontal axis.

2. The apparatus according to claim 1, wherein the at least one of the stacker boom and the reclaimer boom are connected by a hinge to the support wheel assembly.

3. The apparatus according to claim 1, wherein the support ring assembly includes a support ring connected to at least one of the stacker boom and the reclaimer boom, and the support ring turns around the center column as the stacker boom or reclaimer boom turns about the center column.

4. The apparatus according to claim 1, further comprising a fixed annular flange extending around the center column, wherein the support ring assembly is supported by the fixed annular flange.

5. The apparatus according to claim 4, wherein the fixed annular flange is welded to center column.

6. The apparatus according to claim 3, wherein the support for the support ring assembly couples the center column and the reclaimer beam and further comprising a second support ring assembly coupled to the stacker boom and the second support ring assembly extends around the center column, wherein the support ring assembly and the second support ring assembly support the stacker boom.

7. The apparatus according to claim 1, wherein the support ring assembly includes slewing grippers attached to a support wheel and the grippers engage the center column or an annular flange extending around the center column.

8. An apparatus according to claim 1 wherein the support ring assembly includes slewing cylinders attached to a support ring, and the cylinders extend to the center column or an annular flange extending around the center column.

9. An apparatus according to claim 1, wherein the support wheel assembly includes braking grippers attached to a support ring and the braking grippers engage the center column or an annular flange extending around the center column.

10. An apparatus according to claim 6, wherein the support ring a assembly is above the second support ring assembly, and the support ring assembly is supported against the center column or a flange attached to the center column by at least one of a slewing gripper, a slewing cylinder and a braking gripper.

11. An apparatus according to claim 1, wherein the support ring assembly is coupled to a lower support structure for the stacker boom, wherein the coupling between the lower support structure and the support wheel ring includes a hinge pivoting about a horizontal axis.

12. An apparatus according to claim 1, wherein the support ring assembly is coupled by a hinge to the reclaimer boom and the hinge pivots about horizontal axis.

13. An apparatus according to claim 1 wherein the support ring assembly is supported against the center column by wheels rotating about a vertical axis and by wheels rotating about a horizontal axis.

14. An apparatus according to claim 1 wherein an elevation of support ring assembly may be adjusted by sliding the support ring along the support column, and the adjustment of the elevation of the support ring adjusts an elevation of the reclaimer boom or stacker boom supported by the support ring assembly.

15. An apparatus according to claim 1 wherein a vertical load applied by the stacker boom is distributed between the support wheel ring assembly and a second support ring assembly extending around the support column.

16. An apparatus according to claim 1 wherein a rotary drive turns the support ring assembly.

17. An apparatus according to claim 1, wherein an exit from the center column is located between the support ring assembly and a second support ring assembly which supports the stacker boom.

18. An apparatus according to claim 1 wherein a slewing motion of the stacker boom is achieved by pulling or pushing against a support flange fixed to the center column and coupled to at least one of a slewing gripper and a slewing cylinder attached to a support ring of the support ring assembly.

19. An apparatus according to claim 1 wherein a slewing movement of the stacker boom or the reclaimer beam is suppressed by a slewing gripper between the support ring assembly and the center column.

20. An apparatus for storing material in a pile and recovering the material from the pile, the apparatus comprises:
   a center column having a vertical axis;
   a stacker boom supported by the center column and turning about the vertical axis of the center column, wherein the stacker boom extends over the pile;
   a reclaimer boom supported on the center column and turning about the vertical axis of the center column independently of the stacker boom, wherein the reclaimer boom is adjacent a lower edge of the pile, and
   a support ring assembly coupling the stacker boom or the reclaimer boom to the center column, wherein the support ring assembly includes an annular support ring concentric with and extending around the center column, and a pivotable coupling between the support ring and the stacker boom or the reclaimer boom, wherein the pivotable coupling allows the stacker boom or the reclaimer boom to pivot about a horizontal axis.

21. The apparatus of claim 20 wherein an annular flange is fixed to the center column, and the support ring assembly includes a pair of vertical wheels oriented vertically and supporting the support ring assembly on an upper surface of the annular flange, where the vertical wheels are aligned along a horizontal line extending through a center axis of the center column, and the support ring assembly further includes a plurality of horizontal wheels oriented horizontally and said horizontal wheels engaging an annular rim of the flange at an perimeter of the flange.

22. The apparatus of claim 20 wherein the pivotable coupling includes a pivot having a horizontal axis, wherein the horizontal axis extends through a vertical axis of the center column.

23. The apparatus of claim 21 wherein the support ring assembly includes at least one hydraulic cylinder extending from the support ring assembly along a line tangent to the center column, wherein one end of the hydraulic cylinder is fixed to the annular support ring of the support ring assembly and an opposite end is affixed to a gripper device which engages a side of the center column.

* * * * *